Patented June 13, 1950

2,511,136

UNITED STATES PATENT OFFICE 2,511,136

STABILIZED NUT BUTTER

Joseph F. Vincent, Milledgeville, Ga., assignor to Stevens Industries, Inc., Dawson, Ga., a corporation of Georgia No Drawing. Application June 30, 1947, Serial No. 758,213

12 Claims. (Cl. 99—128)

My invention relates to the improvement of nut butters or spreads. More particularly it relates to the stabilization thereof by the incorporation of certain additives therein.

Ordinary nut butters, such as peanut butter, are much in need of improvement in some of their physical and chemical characteristics. When peanut butter is prepared simply by grinding roasted peanuts to the desired consistency, the oil rapidly separates from the solids by gravity forming a top layer of oil, peanut butter of light consistency below, and a rather dry product at the bottom of the container, having insufficient oil to give it the required spreadability. Excessive stickiness in the mouth and poor flavor retention are other undesirable characteristics often encountered.

The principal object of my invention is to prepare a nut butter that will be stable during long periods of storage, shipping, etc., even at elevated temperatures, such as frequently prevail during the summer time. Stability refers not only to oil retention, but also to retention of flavor, color, consistency and the like. Other objects are to improve the spreadability and flavor and to reduce the adhesiveness of the nut butter. Still further objects and advantages will become apparent from the following detailed description of my invention.

I have found that the objects of my invention may be attained to a remarkable degree by controlling the hydrogen ion concentration of the nut butter within certain limits and at the same time incorporating certain fatty additives. Neither factor alone will achieve the desired results, but only the combination of both.

The first essential feature of my invention resides in the control of the hydrogen ion concentration. The pH values of the nut butters are determined in each case by a standardized method which consists essentially of taking a given weight of the nut butter and thoroughly mixing it with an equal weight of water. The hydrogen ion concentration of the resultant slurry is then measured electro-chemically using a glass electrode. By this method it was found that the usual run of ground roasted peanuts gives a butter having a pH of about 6.0. Samples of various peanut butters available on the market were tested and all were found to have pH values ranging from 6.0 to 6.3.

In order to realize the benefits of my invention, it is necessary that the pH value of the nut butter be adjusted within the range from 6.5 to 7.5. This requires the addition of an alkalinizing agent, such as sodium or potassium hydroxide. Alkaline reacting salts may likewise be used. My preferred alkalinizing agent is disodium hydrogen phosphate, and generally about 1% to about 2% by weight of this agent will suffice to impart a pH value to the nut butter within the optimum portion of the aforesaid range. When adding sufficient alkalinizing agent to raise the pH of the nut butter above 7.0, the taste of the butter may be slightly impaired. Consequently, my preferred range of pH values lies between 6.5 and 7.0.

The other essential feature of my invention resides in the incorporation of certain fatty additives. These are edible fatty acids of the $C_{16}$ to $C_{18}$ series, such as stearic acid, and fats composed primarily of glycerides of such acids, such as hydrogenated peanut oil. The amounts of these fatty additives are not so critical, but at least 0.2% by weight should be used. Best results are obtained, when adding from about 0.75% to about 2% of the fatty acid or fat. It is not advisable to add more than about 3%, as this would merely result in substantially increasing the cost without further improvement in the quality of the nut butter.

Further, optional features of my invention have to do with the addition of water to replace the moisture lost during the roasting operation, and of dextrose to improve the flavor and reduce adhesiveness. Ordinarily the addition of from 2% to 3% of water to a peanut butter will result in a marked hardening that is objectionable from the standpoint of spreadability, and will cause the butter to darken in color with aging, particularly at elevated temperatures. However, when the pH is controlled within the limits set forth above, the butter ground to a very fine state, and a fatty additive of the group consisting of fatty acids of the $C_{16}$ to $C_{18}$ series and fats composed primarily of glycerides of such acids is added, these detrimental effects of the added water do not appear. This is very fortunate, as it enables me to add both the alkalinizing agent and the dextrose in the form of an aqueous solution, which greatly facilitates their uniform incorporation in the peanut butter and insures a smooth texture. The amount of dextrose added is not critical, this being largely a matter of taste. It may range up to about 10% by weight, and I have found about 5% to be very satisfactory.

Tests have established that my improved peanut butter will show no appreciable oil separation when stored for as long as eight weeks at 25° C. and even at 40° C. Flavor, color, spreadability, etc. were not substantially impaired. These results indicate a remarkable improvement in stability. Comparison with various peanut butters now on the market demonstrates that my product is at least four times more stable than the best of these under summer conditions (40° C.).

The reasons for the great improvement in stability of my nut butter have not been determined. While I do not wish to be limited to any theory of operation, I believe that the higher than normal pH value prevailing in my nut butter increases the solubility of the proteins therein and allows them to swell due to imbibition of water. Somehow this effect in combination with that of the added fatty acid or fat results in the marked improvement observed. Strangely enough, adjustment of the pH value to within the specified range has little effect by itself. It requires the addition of the fatty additive under these conditions to bring about the improvement according to my invention.

The method of preparing my improved nut butters is very simple. For example, in producing an improved peanut butter I follow the customary steps of shelling, roasting and blanching the peanuts and then grinding them into a homogeneous mass in a suitable mill. The degree of grinding may vary widely, but I prefer to employ a very fine grind, such as is obtained by using a colloid mill. During this grinding process I add the various additives in the desired quantities, so that they will be thoroughly mixed and uniformly incorporated throughout the mass. Preferably, I first prepare a syrup composed of water, alkalinizing agent and dextrose in the desired proportions, and then carefully meter this syrup into the mill along with the fatty acid or fat.

A few tests will quickly indicate the amount of alkalinizing agent required to form the optimum hydrogen ion concentration in the butter. I have obtained the best results by adding a syrup containing 2.0% by weight of the product of water, 1.2% of anhydrous disodium hydrogen phosphate and 5.0% of dextrose (powdered). This result is achieved by adding to the ground, roasted peanuts 8.2% by weight of a syrup composed of 24% water, 15% anhydrous disodium hydrogen phosphate and 61% dextrose. Along with this syrup I added either 1.2% by weight of the whole of stearic acid or 1.5% of hydrogenated peanut oil. The resultant, stabilized products were then packaged by standard procedures and subjected to the storage tests mentioned above.

As many widely different embodiments of this invention may be made without departing from the spirit and scope hereof, it is to be understood that the invention is not limited to the specific embodiments hereof except as defined in the appended claims.

I claim:

1. An improved nut butter comprising a stable, homogeneous mixture of comminuted nuts, an alkalinizing agent in an amount sufficient to impart to said mixture a pH of about 6.5 to about 7.5, and more than 0.2% by weight of the product of a fatty additive of the group consisting of fatty acids of the $C_{16}$ to $C_{18}$ series and fats composed primarily of glycerides of such acids.

2. An improved nut butter as claimed in claim 1 wherein the fatty additive is stearic acid.

3. An improved nut butter as claimed in claim 1 wherein the fatty additive is hydrogenated peanut oil.

4. An improved peanut butter comprising a stable, homogeneous mixture of comminuted peanuts, an alkaline reacting salt in an amount sufficient to impart to said mixture a pH of from 6.5 to 7.0 and an added amount of from 0.2% to 3.0% by weight of the product of a fatty additive of the group consisting of fatty acids of the $C_{16}$ to $C_{18}$ series and fats composed primarily of glycerides of such acids.

5. An improved peanut butter as claimed in claim 4 in which the peanuts are very finely comminuted and to which up to 3.0% of water and up to 10% of dextrose is added.

6. An improved peanut butter comprising a stable, homogeneous mixture of very finely comminuted peanuts, disodium hydrogen phosphate in an amount sufficient to impart to said mixture a pH of from 6.5 to 7.0, from 0.75% to 2.0% by weight of the product of stearic acid, up to 3.0% by weight of the product of added water, and up to 5% by weight of the product of dextrose.

7. An improved peanut butter as claimed in claim 6 in which the stearic acid is replaced by hydrogenated peanut oil.

8. A method of preparing a stabilized peanut butter which comprises uniformly incorporating within a mass of very finely comminuted peanuts from 0.2% to 3.0% by weight of the product of a fatty additive of the group consisting of fatty acids of the $C_{16}$ to $C_{18}$ series and fats composed primarily of glycerides of such acids, and a syrup composed of water, an alkalinizing agent and dextrose in an amount sufficient to raise the pH value of the product to between about 6.5 and about 7.5 without thereby adding more than 3.0% by weight of the product of water.

9. A method of preparing a stabilized peanut butter which comprises adding to a mass of roasted peanuts, while very finely grinding the same in a mill, from 0.75% to 2% by weight of the product of stearic acid, and approximately 8.2% by weight of the product of a syrup composed of about 24% water, 15% anhydrous disodium hydrogen phosphate and 61% dextrose.

10. A method as claimed in claim 9 in which the stearic acid is replaced by hydrogenated peanut oil.

11. An improved peanut butter comprising a stable homogeneous mixture of comminuted peanuts, an alkaline reacting salt in an amount sufficient to impart to said mixture a pH of from 6.5 to 7.0, from 0.2% to 3.0% by weight of the product of a fatty additive of the group consisting of fatty acids of the $C_{16}$ to $C_{18}$ series and fats composed primarily of glycerides of such acids, and up to 10% by weight of the product of dextrose.

12. An improved peanut butter as claimed in claim 11, containing up to 3.0% by weight of the product of added water.

JOSEPH F. VINCENT.

REFERENCES CITED

The following references are of record in the file of this patent:

UNITED STATES PATENTS

| Number | Name | Date |
|---|---|---|
| 685,665 | Bell | Oct. 29, 1901 |
| 1,395,934 | Stockton | Nov. 1, 1921 |
| 1,398,352 | Willison | Nov. 29, 1921 |
| 1,696,766 | Howe | Dec. 25, 1928 |
| 2,302,574 | Richardson et al. | Nov. 17, 1942 |
| 2,402,915 | Rosefield et al. | June 25, 1946 |

FOREIGN PATENTS

| Number | Country | Date |
|---|---|---|
| 13,866 | Great Britain | 1900 |